United States Patent
Kobayashi et al.

(10) Patent No.: US 8,342,971 B2
(45) Date of Patent: Jan. 1, 2013

(54) FIXED TYPE CONSTANT VELOCITY UNIVERSAL JOINT

(75) Inventors: Masazumi Kobayashi, Iwata (JP); Kisao Yamazaki, Iwata (JP); Hisaaki Kura, Iwata (JP); Shin Tomogami, Iwata (JP)

(73) Assignee: NTN Corporation, Osaka (JP)

( * ) Notice: Subject to any disclaimer, the term of this patent is extended or adjusted under 35 U.S.C. 154(b) by 255 days.

(21) Appl. No.: 12/522,981

(22) PCT Filed: Jan. 7, 2008

(86) PCT No.: PCT/JP2008/050046
§ 371 (c)(1),
(2), (4) Date: Jul. 13, 2009

(87) PCT Pub. No.: WO2008/096557
PCT Pub. Date: Aug. 14, 2008

(65) Prior Publication Data
US 2010/0069164 A1    Mar. 18, 2010

(30) Foreign Application Priority Data
Feb. 2, 2007   (JP) .................................. 2007-024334

(51) Int. Cl.
*F16D 3/224*    (2011.01)
(52) U.S. Cl. ........................................ 464/145; 464/906
(58) Field of Classification Search .................. 464/145, 464/906
See application file for complete search history.

(56) References Cited

U.S. PATENT DOCUMENTS
6,431,988 B1   8/2002  Tone
7,704,149 B2 *  4/2010  Yamazaki et al. ............ 464/145

FOREIGN PATENT DOCUMENTS
| DE | 195 14 868 | 5/1996 |
| EP | 1 669 622 A1 * | 6/2006 |
| JP | 09-088995 | 3/1997 |
| JP | 2000-154833 | 6/2000 |
| JP | 3678026 | 6/2000 |
| JP | 2001-065591 | 3/2001 |
| JP | 2001-304282 | 10/2001 |

OTHER PUBLICATIONS

International Search Report mailed Feb. 26, 2008 for International Application No. PCT/JP2008/050046.

(Continued)

*Primary Examiner* — Gregory Binda
(74) *Attorney, Agent, or Firm* — Wenderoth, Lind & Ponack, L.L.P.

(57) ABSTRACT

A fixed type constant velocity universal joint secures smooth rotation and reduces a load on a cage even at a large operating angle and when bearing large torque. The universal joint includes an outer joint member having an inner spherical surface in which track grooves are circumferentially formed in an axial direction and an inner joint member having an outer spherical surface in which track grooves paired with the track grooves of the outer joint member are circumferentially formed in the axial direction and multiple outer spherical surface portions circumferentially arranged. Balls are interposed between the track grooves of the outer and inner joint members for transmitting torque. A cage is interposed between the inner spherical surface and the outer spherical surface for retaining the balls. A spherical surface angle of the outer spherical surface on a joint opening side is set to 12.5° or more.

6 Claims, 7 Drawing Sheets

OTHER PUBLICATIONS

International Preliminary Report on Patentability and Written Opinion of the International Searching Authority mailed Aug. 13, 2009 for International Application No. PCT/JP2008/050046.

NTN Corporation, Constant Velocity Joints for Automobiles, Japan, Edition Aug. 6, 2005, CAT. No. 5601-4/JE, pp. 4-7.

GKN Driveline, Constant Velocity Driveshafts for Industry, Commercial- and Special-Type Vehicles, U.K., Edition 2006/2007, p. 16.

* cited by examiner

US 8,342,971 B2

FIXED TYPE CONSTANT VELOCITY UNIVERSAL JOINT

TECHNICAL FIELD

The present invention relates to a fixed type constant velocity universal joint which is used, for example, in the power transmitting system of automobiles and various industrial machines and which solely allows displacement of an operating angle between two shafts on the driving side and the driven side.

BACKGROUND ART

A fixed type constant velocity universal joint is an example of a constant velocity universal joint used as means for transmitting torque from the engine of an automobile to the wheels at constant velocity. The fixed type constant velocity universal joint connects two shafts on the driving side and the driven side and is provided with a structure allowing constant-velocity transmission of rotational torque even when the two shafts form an operating angle. Generally, as an example of the widely-known fixed type constant velocity universal joint described above, there may be given one adopting a birfield type (BJ) or an undercut free type (UJ).

For example, the fixed type constant velocity universal joint of the BJ type includes an outer joint member having opened one end and an inner spherical surface in which multiple track grooves are equiangularly formed in an axial direction, an inner joint member having an outer spherical surface in which multiple track grooves paired with the track grooves of the outer joint member are equiangularly formed in the axial direction, multiple balls interposed between the track grooves of the outer joint member and the track grooves of the inner joint member, for transmitting torque, and a cage interposed between the inner spherical surface of the outer joint member and the outer spherical surface of the inner joint member, for retaining the balls.

The multiple balls are equiangularly arranged while being accommodated in pockets formed in the cage. Further, internal components including those inner joint member, balls, and cage are accommodated inside the outer joint member. The inner joint member has a shape in which the outer spherical surface thereof has multiple protruding portions formed between the track grooves.

When a constant velocity universal joint of this type is used, for example, for an automotive drive shaft, there is generally employed the structure in which the outer joint member is connected to a driven shaft, and a drive shaft extending from a plunging type constant velocity universal joint mounted to a differential on the vehicle body side is connected to the inner joint member through spline fit-engagement. In this constant velocity universal joint, when an operating angle is formed between the outer joint member and the inner joint member, the balls accommodated in the cage are always maintained within the bisector plane of any operating angle, thereby securing the constant velocity property of the joint.

In the fixed type constant velocity universal joint, generally, the inner joint member is assembled to the cage by the following procedures. First, the inner joint member is arranged relatively to the cage in the direction of being rotated by 90° with respect to the axial direction of the cage. Then, in a state of fitting one of the protruding portions positioned between the track grooves of the inner joint member into one of the pockets of the cage, the inner joint member is inserted into the cage. The center of the inner joint member and the center of the cage are caused to correspond to each other, and then the inner joint member is rotated by 90° with respect to the axial direction of the cage. In this manner, the axial line of the cage is caused to correspond to the axial line of the inner joint member, whereby arrangement in a regular posture is achieved (refer to Patent Documents 1 and 2, for example).

Patent Document 1: DE 19514868 C1
Patent Document 2: JP 3678026 B

SUMMARY OF THE INVENTION

Problem to be Solved by the Invention

Incidentally, as disclosed in Patent Documents 1 and 2 described above, in order to facilitate fitting of the protruding portions of the inner joint member into the pockets of the cage at the time of assembling the inner joint member to the cage, notched portions are formed in the joint opening side end portion of the outer spherical surface of the inner joint member.

However, in the case where the inner joint member has a shape in which the notched portions are formed in the joint opening side end portion of the outer spherical surface, the contact area between the outer spherical surface of the inner joint member and the inner spherical surface of the cage is decreased correspondingly to the notched portions thus formed. As a result, when the joint forms a large operating angle and large torque is applied thereto, the inner spherical surface of the cage receives the spherical surface force from the inner joint member within a small contact area, and an excessive load is applied to the cage. Owing to the excessive load applied to the cage, it becomes difficult to obtain smooth rotation of the joint, which may impair the operability of the joint, and may lead to difficulty in securing sufficient strength of the cage.

In this regard, it is an object of the present invention to provide a fixed type constant velocity universal joint capable of securing smooth rotation and reducing a load on the cage even at a large operating angle and at the time of bearing large torque.

Means for Solving the Problem

According to the present invention, there is provided a fixed type constant velocity universal joint, comprising: an outer joint member having opened one end and an inner spherical surface in which multiple track grooves are formed in an axial direction; an inner joint member having an outer spherical surface in which multiple track grooves paired with the track grooves of the outer joint member are formed in the axial direction and multiple outer spherical surface portions circumferentially arranged; multiple balls interposed between the track grooves of the outer joint member and the track grooves of the inner joint member, for transmitting torque; and a cage interposed between the inner spherical surface of the outer joint member and the outer spherical surface of the inner joint member, for retaining the balls, wherein: a center curvature of the track grooves of the outer joint member and a center curvature of the track grooves of the inner joint member are axially offset in opposite directions from each other with respect to a joint center by equal distances; and a spherical surface angle of the outer spherical surface of the inner joint member, which is positioned on a joint opening side, is set to 12.5° or more.

In this case, the "outer spherical surface portions" of the inner joint member represent protruding portions arranged between the multiple track grooves and swelling from bottoms of the track grooves to the radially outer side, and the circumferential spherical surface of the protruding portions is referred to as an "outer spherical surface". Further, the "joint opening side" of the outer spherical surface represents an opening side of the outer joint member. In addition, the "spherical surface angle" represents an axial angle formed by the joint opening side end portion of the outer spherical surface with respect to the center of the outer spherical surface (joint center) of the inner joint member.

In the present invention, the spherical surface angle of the outer spherical surface of the inner joint member, which is positioned on the joint opening side thereof, is set to 12.5° or more. With this, even when a large spherical surface force acts from the outer spherical surface of the inner joint member onto the inner spherical surface of the cage at a large operating angle and at the time of bearing large torque, it is possible to secure the area in which the joint opening side end portion of the outer spherical surface of the inner joint member is brought into contact with the inner spherical surface of the cage, the area being sufficient for bearing the above-mentioned spherical surface force. By securing the contact area, it is possible to avoid application of an excessive load to the cage, thereby possible to secure smooth rotation.

In the fixed type constant velocity universal joint according to the present invention, it is desirable that a notched portion be formed in an outer portion of each of the outer spherical surface portions of the inner joint member, the outer portion being positioned on the joint opening side with respect to the spherical surface angle.

In this fixed type constant velocity universal joint, when the inner joint member is assembled to the cage, in a state of fitting one of the outer spherical surface portions of the inner joint member into one of the pockets of the cage, the inner joint member is inserted into the cage. In this context, when the notched portion is formed in the outer portion positioned on the joint opening side with respect to the spherical surface angle of the outer spherical surface portions of the inner joint member as described above, one of the outer spherical surface portions of the inner joint member can be easily fitted into one of the pockets of the cage.

Note that, while it is desirable that the notched portion be formed in each of all the outer spherical surface portions of the inner joint member, it is sufficient that the notched portion is formed in at least one of the outer spherical surface portions. When the notched portion is formed in at least one of the outer spherical surface portions, at the time of assembling the inner joint member to the cage, one of the outer spherical surface portions of the inner joint member can be easily fitted into one of the pockets of the cage. When the notched portion is formed in each of all the outer spherical surface portions of the inner joint member, an arbitrary one of the outer spherical surface portions is fitted into one of the pockets of the cage, which leads to enhancement in operability.

Note that the present invention is applicable to both a fixed type constant velocity universal joint of a birfield type (BJ) including an outer joint member and an inner joint member with track grooves each having a single circular arc shape in an axial vertical section, and a fixed type constant velocity universal joint of an undercut free type (UJ) including an outer joint member and an inner joint member with track grooves each having a straight bottom parallel with the axial direction.

Effects of the Invention

According to the present invention, the spherical surface angle of the outer spherical surface of the inner joint member, which is positioned on the joint opening side thereof, is set to 12.5° or more. With this, even when a large spherical surface force acts from the outer spherical surface of the inner joint member onto the inner spherical surface of the cage at a large operating angle and at the time of bearing large torque, it is possible to sufficiently secure the area in which the joint opening side end portion of the outer spherical surface of the inner joint member is brought into contact with the inner spherical surface of the cage. Therefore, it is possible to alleviate the phenomenon in which the joint opening side end portion of the outer spherical surface of the inner joint member bites into the inner spherical surface of the cage.

As described above, by securing the contact area, it is possible to reduce the excessive load on the cage, and hence possible to secure the cage strength with which a large spherical surface force from the outer spherical surface of the inner joint member onto the inner spherical surface of the cage can be born, thereby possible to provide a highly-reliable and longer-life fixed type constant velocity universal joint smoothly rotated owing to excellent operability.

BRIEF DESCRIPTION OF THE DRAWINGS

FIG. 8a is a partial sectional view of an example of a notched portion formed in the inner joint member of FIG. 3a.

FIG. 9a is a partial sectional view of another example of the notched portion formed in the inner joint member of FIG. 3a.

Figure 1:
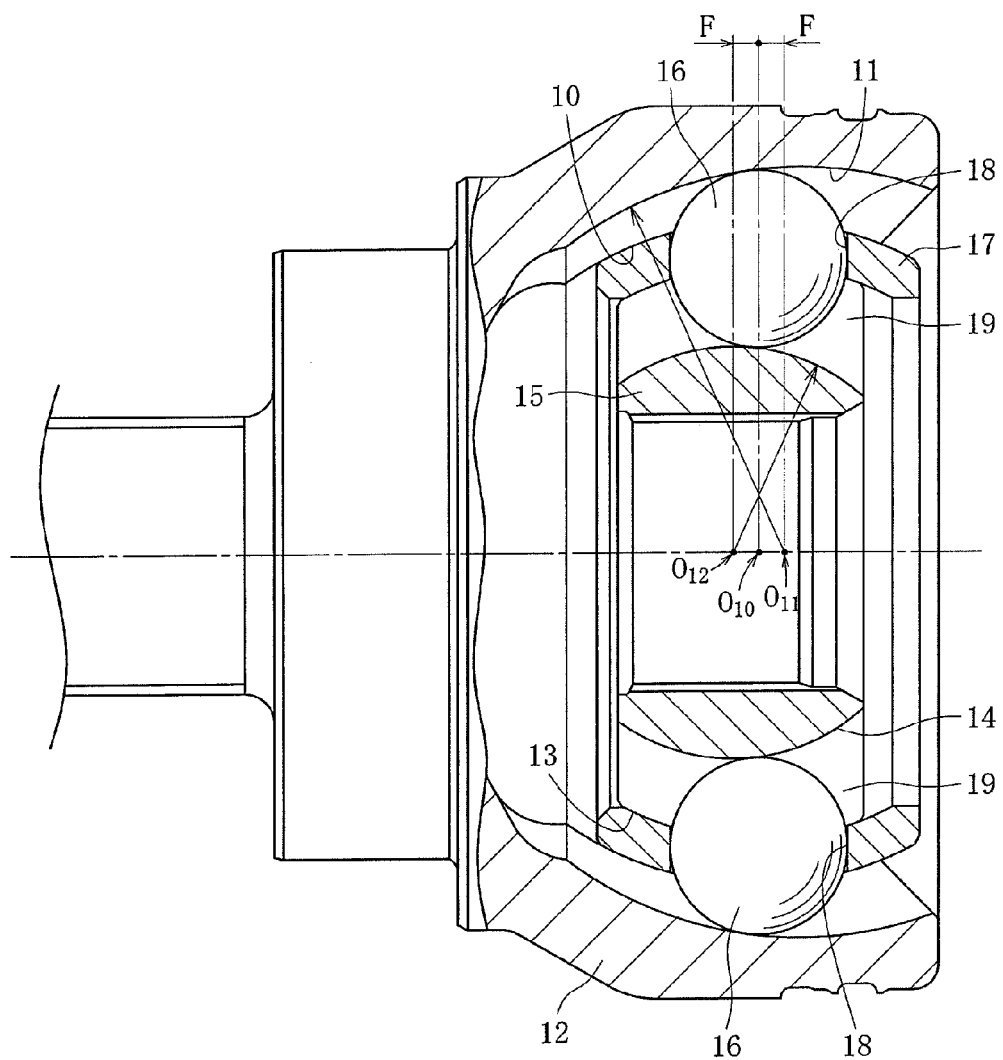
FIG. 1 is a sectional view of an entire structure of a fixed type constant velocity universal joint of a birfield type according to an embodiment of the present invention.

DESCRIPTION OF SYMBOLS 10, 20 inner spherical surface
11, 21 track groove
12, 22 outer joint member
13, 23 outer spherical surface
14, 24 track groove
15, 25 inner joint member
16, 26 ball 17, 27 cage
18, 28 pocket
19, 29 outer spherical surface portion
41, 42, 51, 52 notched portion
$\alpha_{10}$, $\alpha_{20}$ spherical surface angle

DETAILED DESCRIPTION OF THE INVENTION

Figure 2:
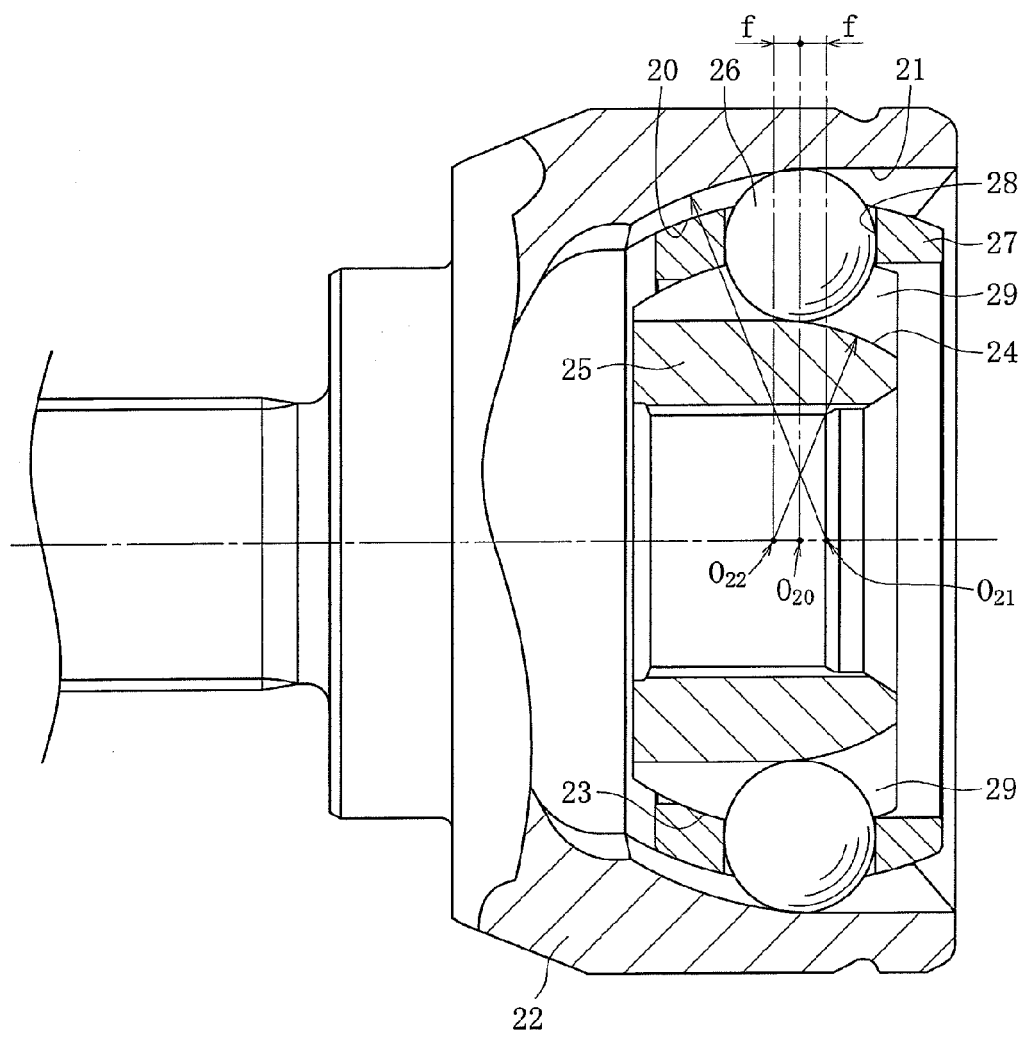
FIG. 2 is a sectional view of an entire structure of a constant velocity universal joint of an undercut free type according to another embodiment of the present invention.

A fixed type constant velocity universal joint according to an embodiment of the present invention is described in detail. The embodiment in FIG. 1 illustrates a fixed type constant velocity universal joint of a birfield type (BJ) including an outer joint member and an inner joint member with track grooves each having a single circular arc shape in an axial vertical section. The embodiment in FIG. 2 illustrates a fixed type constant velocity universal joint of an undercut free type (UJ) including an outer joint member and an inner joint member with track grooves each having a straight bottom parallel with the axial direction. Note that the present invention is also applicable to fixed type constant velocity universal joints having configurations of the track grooves other than those birfield type or undercut free type.

The fixed type constant velocity universal joint of the BJ type in FIG. 1 includes an outer joint member 12 having opened one end and an inner spherical surface 10 in which multiple track grooves 11 are equiangularly formed in an axial direction, an inner joint member 15 having an outer spherical surface 13 in which multiple track grooves 14 paired with the track grooves 11 of the outer joint member 12 are equiangularly formed in the axial direction, multiple balls 16 interposed between the track grooves 11 of the outer joint member 12 and the track grooves 14 of the inner joint member 15, for transmitting torque, and a cage 17 interposed between the inner spherical surface 10 of the outer joint member 12 and the outer spherical surface 13 of the inner joint member 15, for retaining the balls 16.

The multiple balls 16 are equiangularly arranged while being accommodated in pockets 18 formed in the cage 17. The number of the balls 16, in other words, the number of the track grooves 11 and 14 and the number of the pockets 18 of the cage 17 are arbitrary and, for example, are six or eight. In this embodiment, while the case of the six balls 16 is illustrated, a compact constant velocity universal joint can be obtained in the case of the eight balls 16. Further, internal components including those inner joint member 15, balls 16, and cage 17 are accommodated inside the outer joint member 12. The inner joint member 15 is arranged between the multiple track grooves 14 and has multiple protruding portions swelling from bottoms of the track grooves to the radially outer side. In the following description, outer spherical surface portions 19 represent the protruding portions, and the outer spherical surface 13 represents a circumferential spherical surface of the outer spherical surface portions 19 constituting the protruding portions.

The track grooves 11, 14 of the constant velocity universal joint of the BJ type have a single circular arc shape in an axial vertical section. A center curvature $O_{11}$ of the track grooves 11 of the outer joint member 12 and a center curvature $O_{12}$ of the track grooves 14 of the inner joint member 15 are axially offset in opposite directions from each other with respect to a joint center $O_{10}$ including a center of the balls by an equal distance F (track offset). Note that a center curvature of the inner spherical surface 10 of the outer joint member 12 (outer spherical surface of cage 17) and a center curvature of the outer spherical surface 13 of the inner joint member 15 (inner spherical surface of cage 17) correspond to the above-mentioned joint center $O_{10}$. As described above, owing to the provision of the track offset, a pair of the track grooves 11, 14 forms a wedge-like ball track having radial intervals gradually becoming larger from the deep side of the outer joint member 12 toward the opening side.

On the other hand, the fixed type constant velocity universal joint of the UJ type in FIG. 2 includes an outer joint member 22 having opened one end and an inner spherical surface 20 in which multiple track grooves 21 are equiangularly formed in an axial direction, an inner joint member 25 having an outer spherical surface 23 in which multiple track grooves 24 paired with the track grooves 21 of the outer joint member 22 are equiangularly formed in the axial direction, multiple balls 26 interposed between the track grooves 21 of the outer joint member 22 and the track grooves 24 of the inner joint member 25, for transmitting torque, and a cage 27 interposed between the inner spherical surface 20 of the outer joint member 22 and the outer spherical surface 23 of the inner joint member 25, for retaining the balls 26.

The multiple balls 26 are equiangularly arranged while being accommodated in pockets 28 formed in the cage 27. The number of the balls 26, in other words, the number of the track grooves 21 and 24 and the number of the pockets 28 of the cage 27 are arbitrary and, for example, are six or eight. In this embodiment, while the case of the six balls 26 is illustrated, a compact constant velocity universal joint can be obtained in the case of the eight balls 26. Further, internal components including those inner joint member 25, balls 26, and cage 27 are accommodated inside the outer joint member 22. The inner joint member 25 is arranged between the multiple track grooves 24 and has multiple protruding portions swelling from bottoms of the track grooves to the radially outer side. In the following description, outer spherical surface portions 29 represent the protruding portions, and the outer spherical surface 23 represents a circumferential spherical surface of the outer spherical surface portions 29 constituting the protruding portions.

The track grooves 21 and 24 in the constant velocity universal joint of the UJ type have straight bottoms parallel with the axial direction. That is, the track grooves 21 of the outer joint member 22 include straight portions positioned on the joint opening side thereof and circular arc portions positioned on the joint deep side thereof, and the track grooves 24 of the inner joint member 25 include straight portions positioned on the joint deep side thereof and circular arc portions positioned on the joint opening side. A center curvature $O_{21}$ of the circular arc portions of the track grooves 21 of the outer joint member 22 and a center curvature $O_{22}$ of the circular arc portions of the track grooves 24 of the inner joint member 25 are axially offset in opposite directions from each other with respect to a joint center $O_{20}$ including a center of the balls by equal distances f (track offset). Note that, a center curvature of the inner spherical surface 20 of the outer joint member 22 (outer spherical surface of cage 27) and a center curvature of the outer spherical surface 23 of the inner joint member 25 (inner spherical surface of cage 27) correspond to the above-mentioned joint center $O_{20}$. As described above, owing to the provision of the track offset, a pair of the track grooves 21 and 24 form a wedge-like ball track having radial intervals gradually becoming larger from the deep side of the outer joint member 22 toward the opening side.

When those constant velocity universal joints are used, for example, for an automotive drive shaft, there is employed the structure in which the respective outer joint members 12 and 22 are connected to a driven shaft, and a drive shaft extending from a plunging type constant velocity universal joint mounted to a differential on the vehicle body side is connected to the respective inner joint members 15 and 25 through spline fit-engagement. In those constant velocity universal joints, when an operating angle is formed between the outer joint members 12 and 22 and the inner joint members 15 and 25, the balls 16 and 26 accommodated in the cages 17 and 27 are always maintained within the bisector plane of any operating angle, thereby securing the constant velocity property of the joint.

Figure 3A:
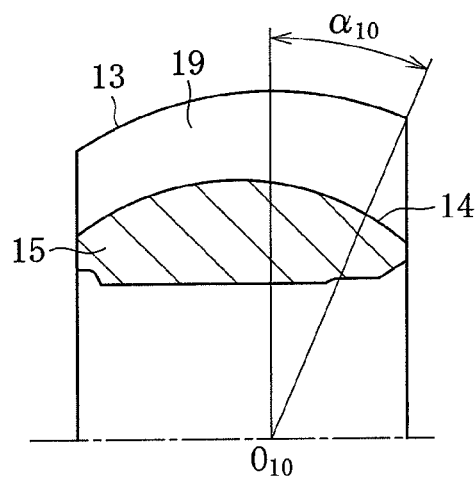
FIG. 3a is a partial sectional view of an inner joint member as a component of the constant velocity universal joint of FIG. 1.
Figure 3B:
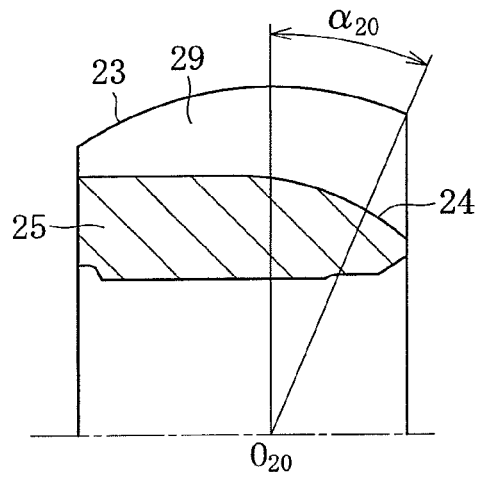
FIG. 3b is a partial sectional view of an inner joint member as a component of the constant velocity universal joint of FIG. 2.
Figure 4:
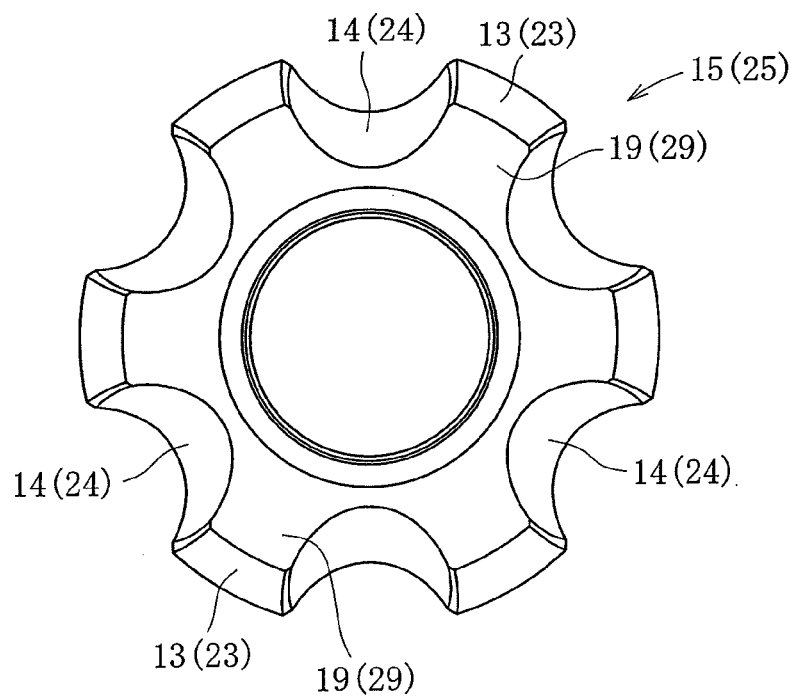
FIG. 4 is a side view for collectively illustrating the inner joint members of the constant velocity universal joints of FIGS. 1 and 2.

FIGS. 3a, 3b, and 4 illustrate the inner joint members 15 and 25 as a component of the fixed type constant velocity universal joints structured as described above. FIG. 3a illustrates the inner joint member 15 incorporated in the constant velocity universal joint of the BJ type illustrated in FIG. 1, and FIG. 3b illustrates the inner joint member 25 incorporated in the constant velocity universal joint of the UJ type illustrated in FIG. 2. Further, FIG. 4 illustrates one of the inner joint members 15 and 25 so as to collectively illustrate the constant velocity universal joints of both the types. In the following, the inner joint members 15 and 25 are collectively described in the constant velocity universal joint of the BJ type and the constant velocity universal joint of the UJ type, respectively.

As respectively illustrated in FIGS. 3a and 3b, spherical surface angles $\alpha_{10}$ and $\alpha_{20}$ ($\alpha_{10}=\alpha_{20}$) of the outer spherical surfaces 13 and 23 of the respective inner joint members 15 and 25 of both the types, which are positioned on the joint opening side thereof (refer to FIG. 4), are set to 12.5° or more. In this case, the spherical surface angles $\alpha_{10}$ and $\alpha_{20}$ represent axial angles formed by the joint opening side end portions of the outer spherical surfaces 13 and 23 with respect to the centers of the outer spherical surfaces (joint centers $O_{10}$ and $O_{20}$) of the inner joint members 15 and 25. In other words, the spherical surface angles $\alpha_{10}$ and $\alpha_{20}$ each represent an angle between a first line that extends through the joint center ($O_{10}$, $O_{20}$) and is perpendicular to a central axis of the inner joint member (15, 25) and a second line that extends through the joint center ($O_{10}$, $O_{20}$) and a joint opening side end portion of the outer spherical surface (13, 23) of the inner joint member (15, 25), the first and second lines being on a plane that has the central axis of the inner joint member (15, 25) extending therealong. The reason for setting the spherical surface angles $\alpha_{10}$ and $\alpha_{20}$ to 12.5° or more is described below.

Figure 5:
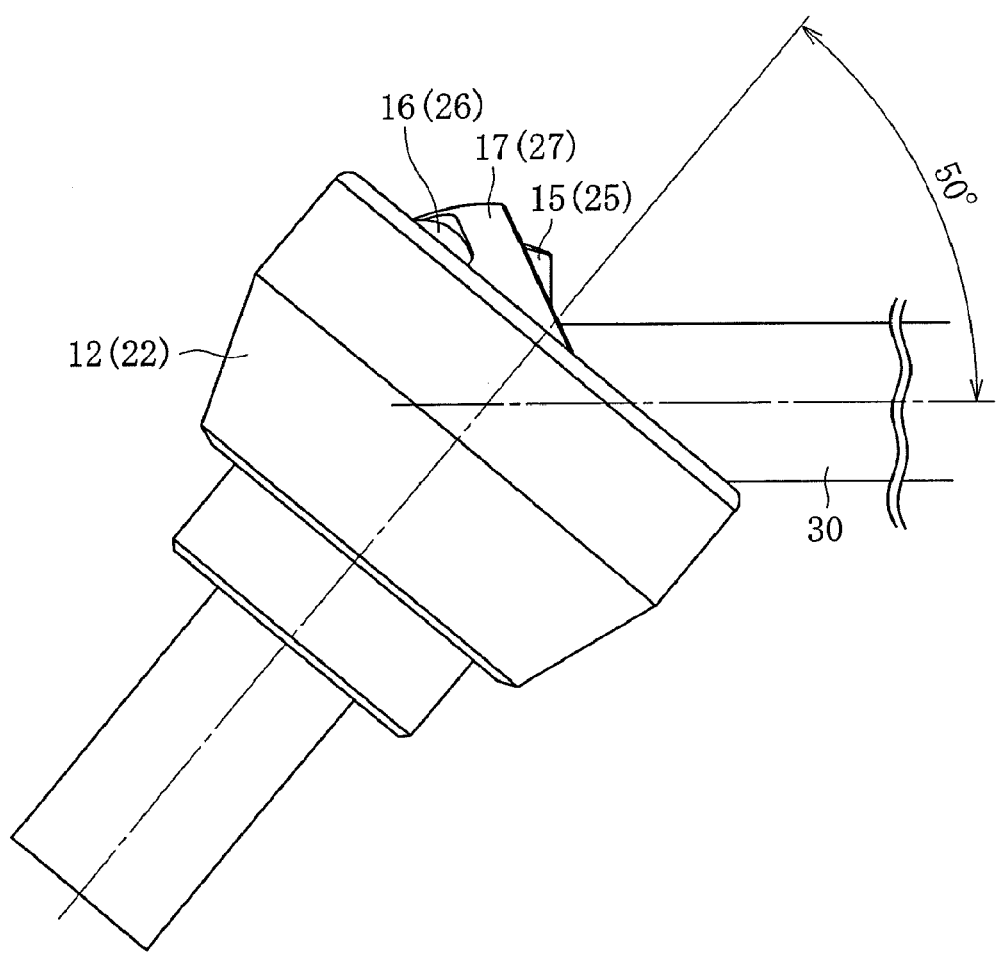
FIG. 5 is a front view of the constant velocity universal joints at a maximum operating angle.
Figure 6:
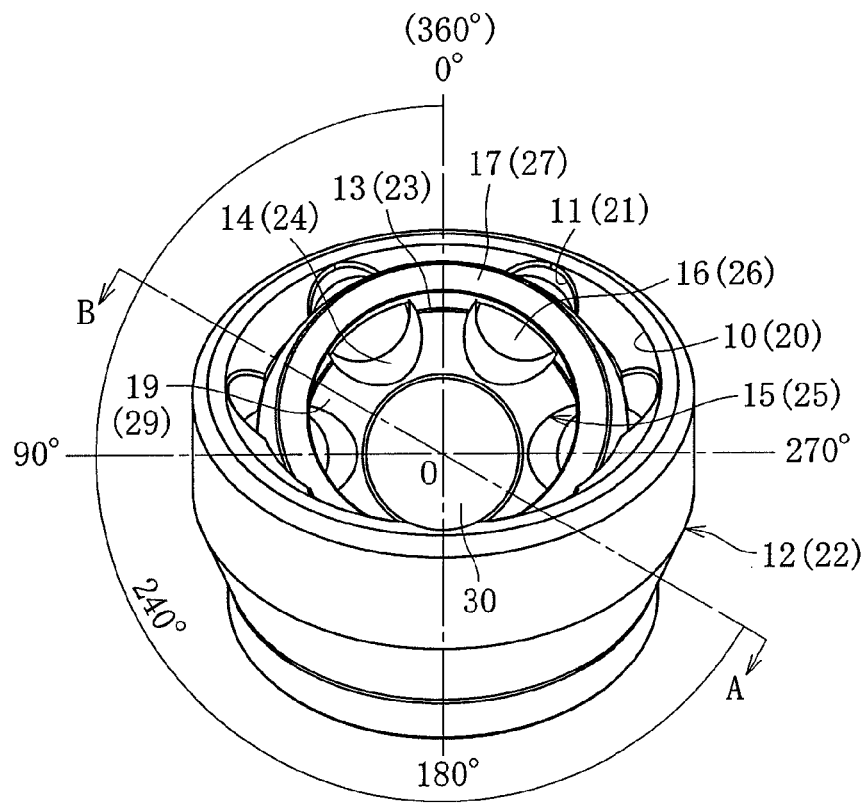
FIG. 6 is a right side view of FIG. 5.

FIGS. 5 and 6 illustrate a state in which a shaft 30 as a drive shaft spline-fitted to the inner joint members 15 and 25 forms a maximum operating angle (50°, for example). When torque is applied to the shaft 30, spherical surface forces are generated between the inner joint members 15 and 25 and the cages 17 and 27, and between the cages 17 and 27 and the outer joint members 12 and 22. Regarding the spherical surface force acting between the inner joint members 15 and 25 and the cages 17 and 27 at the time of the maximum operating angle, in the case where the shaft 30 forms, at phase angles ranging from 0° to 360° (refer to FIG. 6), the maximum operating angle in the direction of a phase angle of 180°, a large spherical surface force is generated particularly at phase angles ranging from 240° to 360°. The spherical surface force is abruptly generated around a phase angle of 240°, which has been zero until then.

Figure 7:
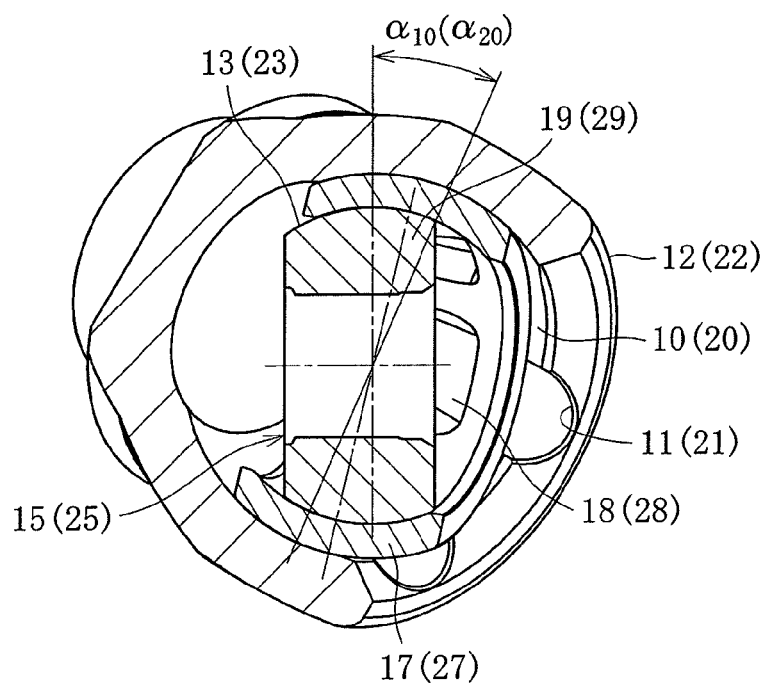
FIG. 7 is a sectional perspective view taken along the line A-O-B of FIG. 6.

In terms of this, focus is placed on a contact state between the inner joint members 15 and 25 and the cages 17 and 27 at the phase angle of 240° when the joint forms a maximum operating angle. FIG. 7 illustrates the contact state between the inner joint members 15 and 25 and the cages 17 and 27. FIG. 7 is a sectional view taken along the line A-O-B of FIG. 6, in which the side A of FIG. 6 (phase angle of 240°) is on the upper side and the side B of FIG. 6 (phase angle of 60°) is on the lower side. Note that, the shaft 30 is omitted in FIG. 7.

As illustrated in FIG. 7, when the shaft 30 forms a maximum operating angle in the direction of the phase angle of 180°, on the side A of FIG. 6 (phase angle of 240°), in the case where the joint opening side end portions of the outer spherical surfaces 13 and 23 of the inner joint members 15 and 25 are brought into contact with the cages 17 and 27 on the deep side with respect to the center curvature of the inner spherical surfaces of the cages 17 and 27, the spherical surface forces from the inner joint members 15 and 25 are only received on the deep side of the inner spherical surfaces of the cages 17 and 27. When the shaft 30 is further rotated in this state, the inner joint members 15 and 25 are rotated in the direction of biting into the inner spherical surfaces of the cages 17 and 27 by the above-mentioned spherical surface forces. As a result, excessive loads are applied to the cages 17 and 27, and the cages 17 and 27 are subjected to excessive stresses at the time of forming large operating angles and bearing large torque in some cases.

As a countermeasure for the excessive loads applied to the cages 17 and 27, the spherical surface angles $\alpha_{10}$ and $\alpha_{20}$ positioned on the joint opening side of the outer spherical surfaces 13 and 23 of the inner joint members 15 and 25 are set to 12.5° or more (refer to FIGS. 3a and 3b). At the time of forming large operating angles and bearing large torque, even when large spherical surface forces act from the joint opening side of the outer spherical surfaces 13 and 23 of the inner joint members 15 and 25 onto the inner spherical surfaces of the cages 17 and 27, it is possible to allow the joint opening side end portions of the outer spherical surfaces 13 and 23 of the inner joint members 15 and 25 to come into contact with the cages 17 and 27 on the inlet side of the inner spherical surfaces of the cages 17 and 27, and thereby possible to sufficiently secure the contact areas so as to bear the above-mentioned spherical surface forces.

By securing the contact areas, it is possible to alleviate the phenomenon in which the joint opening side end portions of the outer spherical surfaces 13 and 23 of the inner joint members 15 and 25 bite into the inner spherical surfaces of the cages 17 and 27. As a result, the cages 17 and 27 can be avoided from bearing excessive loads, whereby smooth rotation can be secured.

As described above, by securing the contact areas, it is possible to reduce the excessive loads on the cages 17 and 27, and hence possible to secure the cage strength with which large spherical surface forces acting from the outer spherical surfaces 13 and 23 of the inner joint members 15 and 25 onto the inner spherical surfaces of the cages 17 and 27 can be born. As a result, it is possible to provide a highly-reliable and longer-life fixed type constant velocity universal joint smoothly rotated owing to excellent operability.

Note that, when the spherical surface angles $\alpha_{10}$ and $\alpha_{20}$ positioned on the joint opening side of the outer spherical surfaces 13 and 23 of the inner joint members 15 and 25 are lower than 12.5°, it becomes difficult to sufficiently secure the contact areas between the inner joint members 15 and 25 and the cages 17 and 27 against the spherical surface forces acting from the inner joint members 15 and 25 onto the cages 17 and 27. As a result, it becomes difficult to reduce excessive loads on the cages 17 and 27 and to secure the cage strength, which may lead to a risk that the joint is not smoothly rotated.

Figure 8A:
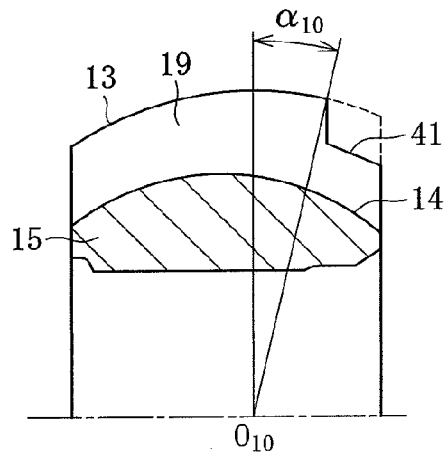
Figure 8B:
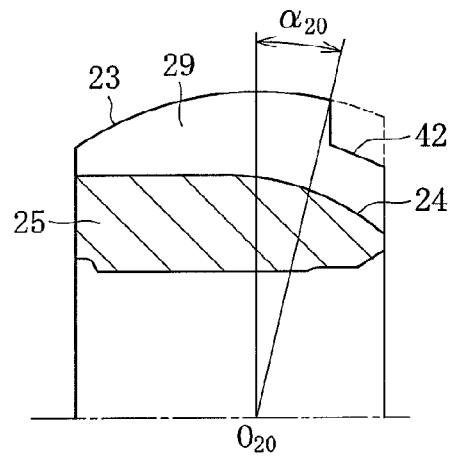
FIG. 8b is a partial sectional view of an example of a notched portion formed in the inner joint member of FIG. 3b.
Figure 9A:
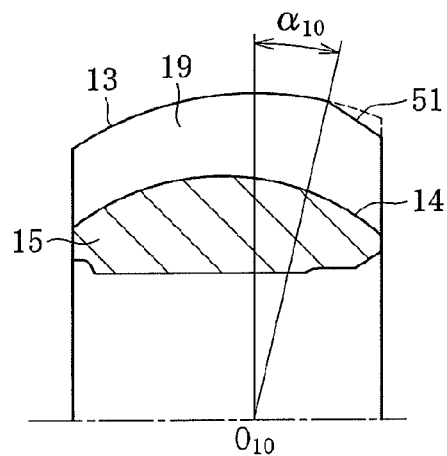
Figure 9B:
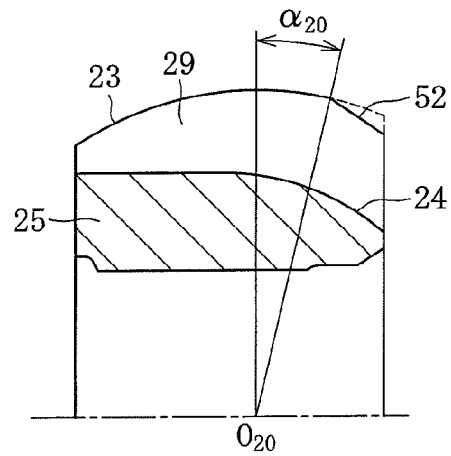
FIG. 9b is a partial sectional view of another example of the notched portion formed in the inner joint member of FIG. 3b.

Next, FIGS. 8a and 8b and FIGS. 9a and 9b illustrate the case where notched portions are formed in the outer portions positioned on the joint opening side with respect to the spherical surface angles $\alpha_{10}$ and $\alpha_{20}$ of the outer spherical surfaces 13 and 23 of the inner joint members 15 and 25. As the notched portions, it is effective to form, as illustrated in FIGS. 8a and 8b, notched portions 41 and 42 having shapes obtained by being notched deeply in a radial direction in a stepped configuration, or to form, as illustrated in FIGS. 9a and 9b, notched portions 51 and 52 having shapes obtained by being notched shallowly in a radial direction in a tapered configuration.

In this case, the inner joint members 15 and 25 are assembled to the cages 17 and 27 by the following procedures. Note that, in the following, while there is illustrated a case of assembling thereto the inner joint members 15 and 25 (notched portions 41 and 42) illustrated in FIGS. 8a and 8b, the same applies to the inner joint members 15 and 25 (notched portions 51 and 52) illustrated in FIGS. 9a and 9b.

Figure 10:
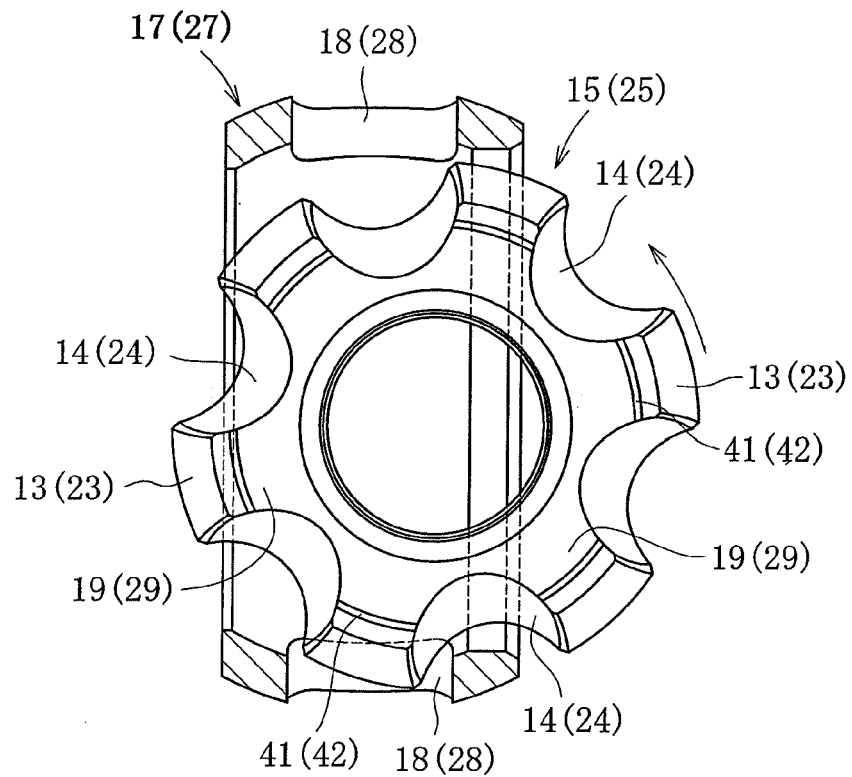
FIG. 10 is a sectional view as seen from the front of the inner joint member of FIG. 8a, 8b, 9a, or 9b in a state of being assembled to a cage.
Figure 11:
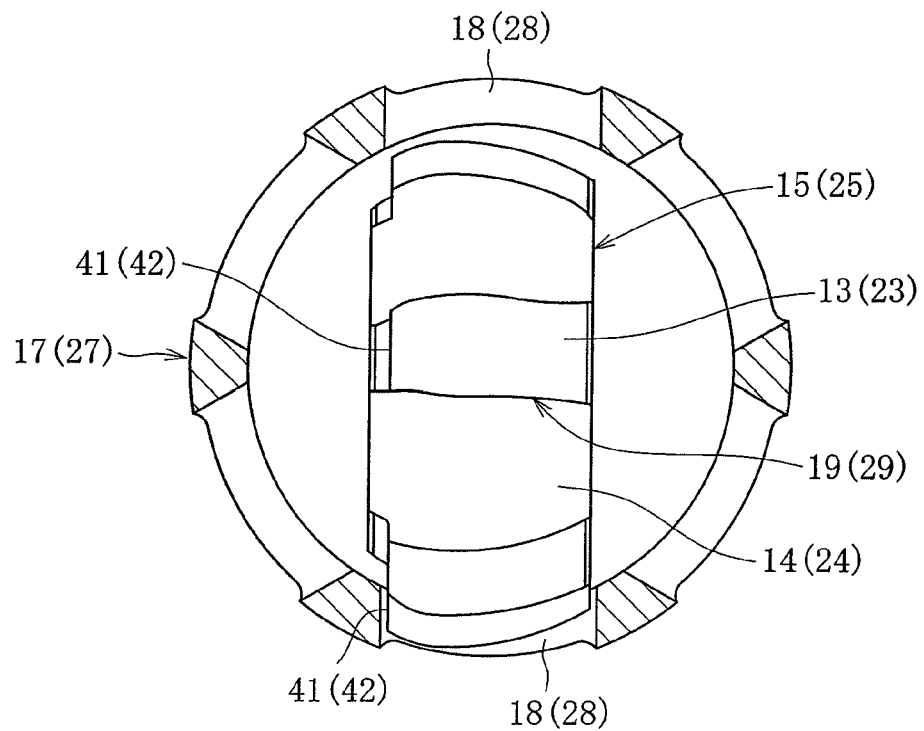
FIG. 11 is a sectional view as seen from the side of the inner joint member of FIG. 8a, 8b, 9a, or 9b in a state of being assembled to a cage.

First, the inner joint members 15 and 25 are arranged relatively to the cages 17 and 27 in the direction of being rotated by 90° with respect to the axial direction of the cages 17 and 27. Then, as illustrated in FIGS. 10 and 11, in a state of fitting one of each of the outer spherical surface portions 19 and 29 positioned between the track grooves 14 and 24 of the inner joint members 15 and 25 into one of each of the pockets 18 and 28 of the cages 17 and 27, the inner joint members 15 and 25 are inserted into the cages 17 and 27.

In this case, as described above, when the notched portions 41 and 42 are formed in the outer spherical surface portions 19 and 29 of the inner joint members 15 and 25 in advance, one of each of the outer spherical surface portions 19 and 29 of the inner joint members 15 and 25 can be easily fitted into one of each of the pockets 18 and 28 of the cages 17 and 27. After that, the centers of the inner joint members 15 and 25 and the centers of the cages 17 and 27 correspond to each other, and then the inner joint members 15 and 25 are rotated by 90° with respect to the axial direction of the cages 17 and 27. In this manner, the axial lines of the cages 17 and 27 are caused to correspond to the axial lines of the inner joint members 15 and 25, whereby arrangement in a regular posture is achieved.

Note that, while it is desirable that the notched portions 41, 42, 51, and 52 be formed in all the outer spherical surface portions 19 and 29 of the inner joint members 15 and 25, it is sufficient that the notched portions are formed in at least one of each of the outer spherical surface portions 19 and 29. In the case of forming the notched portions 41, 42, 51, and 52 in all the outer spherical surface portions 19 and 29, it is sufficient that the notched portions 41, 42, 51, and 52 are formed at the time of forging the inner joint members 15 and 25, or also can be formed by lathe-turning after the forging. Further, in the case of forming the notched portions 41, 42, 51, and 52 not in all the outer spherical surface portions 19 and 29, it is sufficient that the notched portions 41, 42, 51, and 52 are formed at the time of forging the inner joint members 15 and 25.

As described above, when the notched portions 41, 42, 51, and 52 are formed in at least one of each of the outer spherical surface portions 19 and 29 in advance, at the time of assembling the inner joint members 15 and 25 to the cages 17 and 27, it becomes easier to fit one of each of the outer spherical surface portions 19 and 29 of the inner joint members 15 and 25 into one of each of the pockets 18 and 28 of the cages 17 and 27. Further, when the notched portions 41, 42, 51, and 52 are formed in all the outer spherical surface portions 19 and 29 of the inner joint members 15 and 25, it becomes possible to fit arbitrary one of each of the outer spherical surface portions 19 and 29 into one of each of the pockets 18 and 28 of the cages 17 and 27, which leads to enhancement in operability.

The present invention is not limited to the above-mentioned embodiments. As a matter of course, various modifications can be made thereto without departing from the spirit of the present invention. The scope of the present invention is defined in claims, and includes all equivalents described in claims and changes within the scope of claims.

The invention claimed is:

1. A fixed type constant velocity universal joint, comprising:
    an outer joint member having:
        an open end; and
        an inner spherical surface in which multiple track grooves are formed in an axial direction;
    an inner joint member having:
        an outer spherical surface in which multiple track grooves paired with the track grooves of the outer joint member are formed in the axial direction; and
        a plurality of outer spherical surface portions circumferentially arranged;
    a plurality of balls interposed between the track grooves of the outer joint member and the track grooves of the inner joint member, for transmitting torque; and
    a cage interposed between the inner spherical surface of the outer joint member and the outer spherical surface of the inner joint member, the cage having a plurality of pockets for retaining the balls,
    wherein a center of curvature of the track grooves of the outer joint member and a center of curvature of the track grooves of the inner joint member are axially offset in opposite directions from each other with respect to a joint center by equal distances,
    wherein a spherical surface angle of the outer spherical surface of the inner joint member is set to 12.5° or more,
    wherein the spherical surface angle is an angle between a first line that extends through the joint center and is perpendicular to a central axis of the inner joint member and a second line that extends through the joint center and a joint opening side end portion of the outer spherical surface of the inner joint member,
    wherein the first and second lines are on a plane that has the central axis of the inner joint member extending there along,
    wherein at least one of the outer spherical surface portions of the inner joint member has an outer portion with a notch formed therein, the outer portion being positioned at the joint opening side end portion with respect to the spherical surface angle,
    wherein the notch allows one of the outer spherical surface portions to be fitted into one of the pockets of the cage when the inner joint member is assembled with the cage, and
    wherein, when a spherical surface force acts from the outer spherical surface of the inner joint member onto an inner spherical surface of the cage, an area in which the joint opening side end portion of the outer spherical surface of the inner joint member is brought into contact with the inner spherical surface of the cage is the area bearing the spherical surface force.

2. A fixed type constant velocity universal joint according to claim 1, wherein each of the outer spherical surface portions of the inner joint member has the outer portion with the notch formed therein.

3. A fixed type constant velocity universal joint according to claim 2, wherein
    the track grooves of the outer joint member have a single circular arc shape along a plane that has a central axis of the outer joint member extending there along, and
    the track grooves of the inner joint member have a single circular arc shape along the plane that has the central axis of the inner joint member extending there along.

4. A fixed type constant velocity universal joint according to claim 2, wherein
the track grooves of the outer joint member have straight bottoms extending parallel to a central axis of the outer joint member along a plane that has the central axis of the outer joint member extending there along, and
the track grooves of the inner joint member have straight bottoms extending parallel to the central axis of the inner joint member along the plane that has the central axis of the inner joint member extending there along.

5. A fixed type constant velocity universal joint according to claim 1, wherein
the track grooves of the outer joint member have a single circular arc shape along a plane that has a central axis of the outer joint member extending there along, and
the track grooves of the inner joint member have a single circular arc shape along the plane that has the central axis of the inner joint member extending there along.

6. A fixed type constant velocity universal joint according to claim 1, wherein
the track grooves of the outer joint member have straight bottoms extending parallel to a central axis of the outer joint member along a plane that has the central axis of the outer joint member extending there along, and
the track grooves of the inner joint member have straight bottoms extending parallel to the central axis of the inner joint member along the plane that has the central axis of the inner joint member extending there along.

* * * * *